United States Patent
Caruso et al.

(10) Patent No.: US 8,643,242 B2
(45) Date of Patent: Feb. 4, 2014

(54) SQUIRREL-CAGE ROTOR FOR ASYNCHRONOUS MOTORS

(75) Inventors: Giovanni Caruso, Monterotondo Stazione (IT); Diego Iannuzzi, Naples (IT); Franco Maceri, Rome (IT); Enrico Pagano, Naples (IT); Luigi Beneduce, Torre de Greco (IT); Antonio Tarantino, Sant' Anastasia (IT); Luigi Piegari, Milan (IT)

(73) Assignee: Ansaldobreda S.p.A. (IT)

( * ) Notice: Subject to any disclaimer, the term of this patent is extended or adjusted under 35 U.S.C. 154(b) by 66 days.

(21) Appl. No.: 13/395,007

(22) PCT Filed: Sep. 8, 2010

(86) PCT No.: PCT/IB2010/002240
§ 371 (c)(1),
(2), (4) Date: May 29, 2012

(87) PCT Pub. No.: WO2011/030203
PCT Pub. Date: Mar. 17, 2011

(65) Prior Publication Data
US 2012/0267978 A1    Oct. 25, 2012

(30) Foreign Application Priority Data
Sep. 9, 2009 (EP) ..................................... 09425344

(51) Int. Cl.
*H02K 17/00* (2006.01)
(52) U.S. Cl.
USPC .......................................... 310/211; 310/270
(58) Field of Classification Search
USPC ....................... 310/211, 261.1, 270
See application file for complete search history.

(56) References Cited

U.S. PATENT DOCUMENTS

| 2,242,339 A | | 5/1941 | Baudry |
| 3,902,087 A | * | 8/1975 | Hakamada et al. ........... 310/211 |
| 4,271,368 A | * | 6/1981 | Burns .................... 310/216.117 |
| 4,453,101 A | * | 6/1984 | Nelson ......................... 310/211 |
| 4,564,777 A | * | 1/1986 | Senoo et al. .............. 310/156.81 |

(Continued)

FOREIGN PATENT DOCUMENTS

| DE | 93 15 587 U1 | 12/1993 |
| JP | 57 146738 U | 9/1982 |

(Continued)

OTHER PUBLICATIONS

International Search Report prepared by the European Patent Office on Feb. 18, 2011, for International Application No. PCT/IB2010/002240.

(Continued)

*Primary Examiner* — Thanh Lam
(74) *Attorney, Agent, or Firm* — Sheridan Ross P.C.

(57) ABSTRACT

A squirrel-cage rotor for asynchronous motors is provided with a lamination stack made of a magnetic material and a plurality of bars, the intermediate portions of which engage respective slots of the lamination stack; the end portions of the bars protrude with respect to the lamination stack at both axial ends of the rotor and are fixed to two shorting rings; a plurality of spaces are defined, axially, by the lamination stack and the shorting rings, and tangentially by the end portions of the bars; part of such spaces is engaged by stiffening blocks arranged in contact with the end portions of the adjacent bars.

14 Claims, 5 Drawing Sheets

(56) References Cited

U.S. PATENT DOCUMENTS

| | | | |
|---|---|---|---|
| 7,791,240 B2 * | 9/2010 | Alfermann et al. | 310/166 |
| 2006/0267441 A1 * | 11/2006 | Hang et al. | 310/211 |
| 2006/0273683 A1 * | 12/2006 | Caprio et al. | 310/211 |
| 2011/0241473 A1 * | 10/2011 | Hippen et al. | 310/211 |
| 2013/0154430 A1 * | 6/2013 | Dragon et al. | 310/211 |

FOREIGN PATENT DOCUMENTS

| | | | |
|---|---|---|---|
| JP | 58 092846 U | 6/1983 | |
| JP | 10 117468 A | 5/1998 | |
| JP | 10 322990 A | 12/1998 | |

OTHER PUBLICATIONS

Written Opinion of the International Searching Authority prepared by the European Patent Office on Feb. 18, 2011, for International Application No. PCT/IB2010/002240.

Applicant's Response to Written Opinion for International Application No. PCT/IB2010/002240 dated Feb. 18, 2011.

International Preliminary Report on Patentability prepared by the European Patent Office on Jan. 9, 2012, for International Application No. PCT/IB2010/002240.

* cited by examiner

SQUIRREL-CAGE ROTOR FOR ASYNCHRONOUS MOTORS

CROSS REFERENCE TO RELATED APPLICATIONS

This application is a national stage application under 35 U.S.C. 371 of PCT Application No. PCT/IB2010/002240 having an international filing date of 8 Sep. 2010, which designated the United States, which PCT application claimed the benefit of European Application No. EP 09425344.0, having a filing date of 9 Sep. 2009, the entire disclosure of each of which is incorporated herein by reference.

TECHNICAL FIELD

The present invention relates to a squirrel-cage rotor for asynchronous motors.

BACKGROUND ART

As is known, squirrel-cage rotors are used in three-phase asynchronous motors, which are highly reliable and inexpensive drives and are also used as alternators in some specific applications.

In the standard configuration for high-power and medium electric voltage applications, for example in railway traction drives, the squirrel-cage rotor comprises a lamination stack made of magnetic material, with a series of slots engaged by respective bars made of aluminium or copper. The bars are parallel to one another, and protrude from the lamination stack at both axial ends of the rotor in a substantially symmetrical manner. The apexes of the bars are welded to two shorting rings, which define the axial ends of the rotor.

The torque moment of an asynchronous motor is generated by the interaction between the magnetic induction field in the air gap, produced by a symmetrical system of currents flowing through the stator windings, and the magnetic induction field in the air gap, generated by the induced currents flowing in the bars of the rotor. The torque moment of the bars is transferred to the lamination stack by the force or pressure that the bars exert on the surfaces of the slots in a tangential direction.

When the stator of an asynchronous motor is supplied by an inverter, the currents flowing through the windings of the stator and rotor are not perfectly sinusoidal, but have harmonics that are not negligible. Stator current harmonics that exceed the fundamental frequency generate air gap magnetic field harmonics, sufficient to induce harmonic currents in the rotor bars.

The interaction between the harmonics at different frequencies of the stator magnetic induction field and the rotor magnetic induction field causes torque moment oscillations.

The frequencies of the torque moment oscillations are given by the sum of or difference between the frequencies of the stator and rotor magnetic fields. Thus, the frequencies of the torque moment oscillations depend on the fundamental frequency of the alternating current set by the inverter in the stator windings, and on the inverter switching frequency. In electric traction drives the alternating current supplied to the stator must have a variable main frequency, so that the motor can run at different speeds. Thus, the range or spectrum of the frequency of said torque moment oscillations is extremely wide in such applications.

The lamination stack and the shorting rings have a different rotational inertia, which means that the torque moment oscillations cause deformations in torsion with an oscillating amplitude, in the end portions of the bars that are arranged between the shorting rings and the lamination stack.

Resonance occurs when the frequency of the torque moment oscillations is close to the torsional eigenfrequency of some components of the rotor and/or of the system driven by the motor. Due to said resonance, the extent of the deformations at the end portions of the bars is significant, and faults often occur due to fatigue breakages in the areas of the joints between the bars and the shorting rings, especially in electric railway traction applications, where highly dynamic and high-power performance levels are required.

The length of the end portions of the bars that protrude with respect to the lamination stack could be reduced to diminish the deformations due to the torque moment oscillations. However, this solution is not satisfactory, as such end portions must in any case be of a minimum length, i.e. there must be a minimum axial distance between the lamination stack and the shorting rings, to guarantee sufficient ventilation for cooling.

Another solution for reducing the deformations due to the torque moment oscillations, proposed by Siemens, consists of bending the end portions of the bars according to different configurations, for example leaving one bar straight and bending the two adjacent bars in order to move their apexes closer to that of the straight bar. Siemens recently also proposed a rotor with no shorting rings, in which it replaced the traditional bars with flexible conducting wires connected to one another.

DISCLOSURE OF INVENTION

The purpose of the present invention is to provide a squirrel-cage rotor for asynchronous motors, which overcomes the problems described above in a simple and inexpensive manner, in that it reduces the fatigue and subsequent breakages in the areas of the joints between the bars and the shorting rings.

According to the present invention there is provided a squirrel-cage rotor for asynchronous motors, as defined in claim 1.

BRIEF DESCRIPTION OF THE DRAWINGS

The present invention will now be described with reference to the accompanying drawings, illustrating a non-limiting embodiment thereof, in which.

BEST MODE FOR CARRYING OUT THE INVENTION

Figure 1:
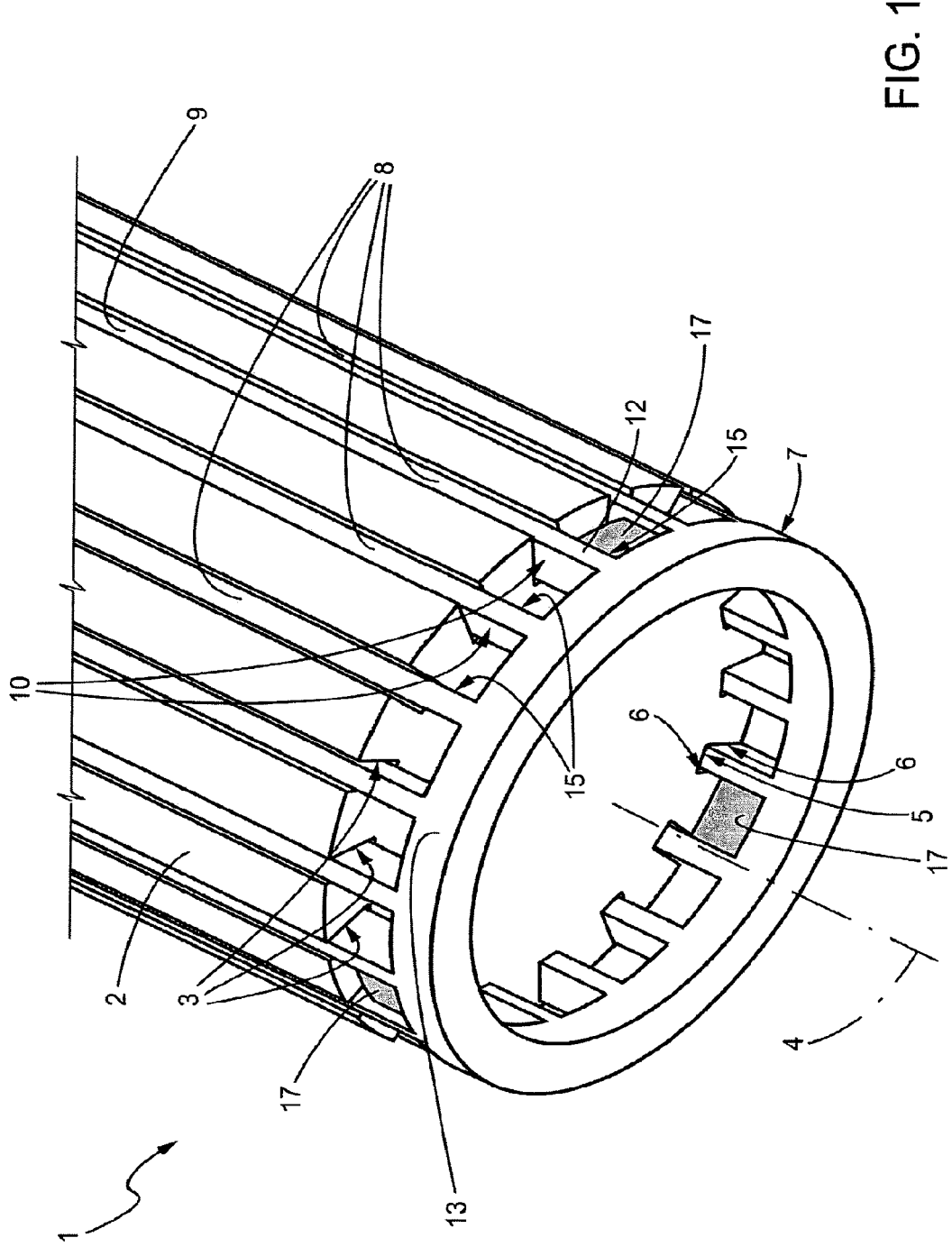
FIG. 1 is a schematic and partial view of a preferred embodiment of the squirrel-cage rotor for asynchronous motors according to the present invention.

In FIG. 1, designated as a whole by number 1 is a squirrel-cage rotor (partially and schematically illustrated). The rotor 1 comprises a lamination stack 2 made of magnetic material. In proximity to its periphery, the stack 2 has a plurality of slots 3, which are parallel to the axis 4 of the rotor 1 and are defined, respectively, by a bottom surface 5 and by two side surfaces 6 facing one another. The cross-section of the slots 3 may, of course, differ from that schematically shown in the figure.

The rotor 1 also comprises a cage 7, which is made for example of copper and is the place of induced currents when the poles of the motor stator (not illustrated) are supplied with alternating electric current. The cage 7 comprises a plurality of bars 8, the cross-section of which is preferably constant from one end to the other of said bars 8.

The bars 8 comprise respective intermediate portions 9 each housed in a corresponding slot 3 and have two opposite side surfaces 10 that rest respectively against the surfaces 6 and transmit the torque moment to the stack 2. The bars 8 also comprise respective opposing end portions 12, which protrude axially with respect to the stack 2. The portions 12 define the extension of the portions 9 parallel to the axis 4. At each axial end of the rotor 1, the apexes of the portions 12 are fixed, for example by means of welding, to a shorting ring 13. In each axial end, the rotor 1 has a series of spaces 15 that are delimited axially by the shorting ring 13 and by an end face of the stack 2, and tangentially by the portions 12 which are adjacent to one another. The spaces 15 keep the shorting rings 13 at a distance from the stack 2 and thus allow the passage of air for cooling the motor.

According to the invention, some of the spaces 15 are engaged by stiffening blocks 17, which are, for example, parallelepiped in shape. The stiffening blocks 17 have opposite side surfaces 18 that rest against the surfaces 10 of the portions 12 of the adjacent bars 8 and are fixed directly to said bars 8, as described more fully below.

The stiffening blocks 17 enable the torsional stiffness to be increased and, thus, make it possible to increase the value of the torsional eigenfrequencies of the rotor 1, in order to reduce the risk of fatigue breakages between the portions 12 and the shorting rings 13. The number, the position and the dimensions of the blocks are defined in the design stage in order to increase the value of the first two eigenfrequencies of the rotor 1. In this way, the increase in torsional stiffness averts the risk of resonance, which could be triggered by torque moment oscillations. As mentioned above, torque oscillations are generated by harmonic frequencies of the alternating current coming from an inverter (not illustrated) and supplying the motor stator. In particular, the aim is to increase at least the first torsional eigenfrequency of the rotor 1, to bring such frequency to above the first harmonic frequency of the torque oscillations.

In each of the two axial ends of the rotor 1, the stiffening blocks 17 preferably have the same shape and the same dimensions, they are arranged in spaces 15 at an equal distance from one another around the axis 4, and have the same position in the respective spaces 15.

There must be a sufficient number of stiffening blocks 17 to be able to reach the desired increase in torsional stiffness and, thus, the desired torsional eigenfrequency values of the rotor 1, without obstructing the flow of air and, thus cooling of the motor. Moreover, the number of stiffening blocks 17 is preferably proportional to the pole pairs of the motor, to avoid any alteration to the symmetry of the electromagnetic behaviour of the cage 7. In the particular example illustrated in FIG. 1, in each axial end of the rotor 1, there are three stiffening blocks 17.

After having chosen the form and the number of the stiffening blocks 17 to be inserted in the spaces 15, the dimensions of the blocks 17 and their positions in the respective spaces 15 are determined. Suitable finite element calculation models or suitable approximate mathematical models are used to evaluate the actual increase in torsional stiffness and the increase in the values of the first two torsional eigenfrequencies of the rotor 1.

Figure 2:
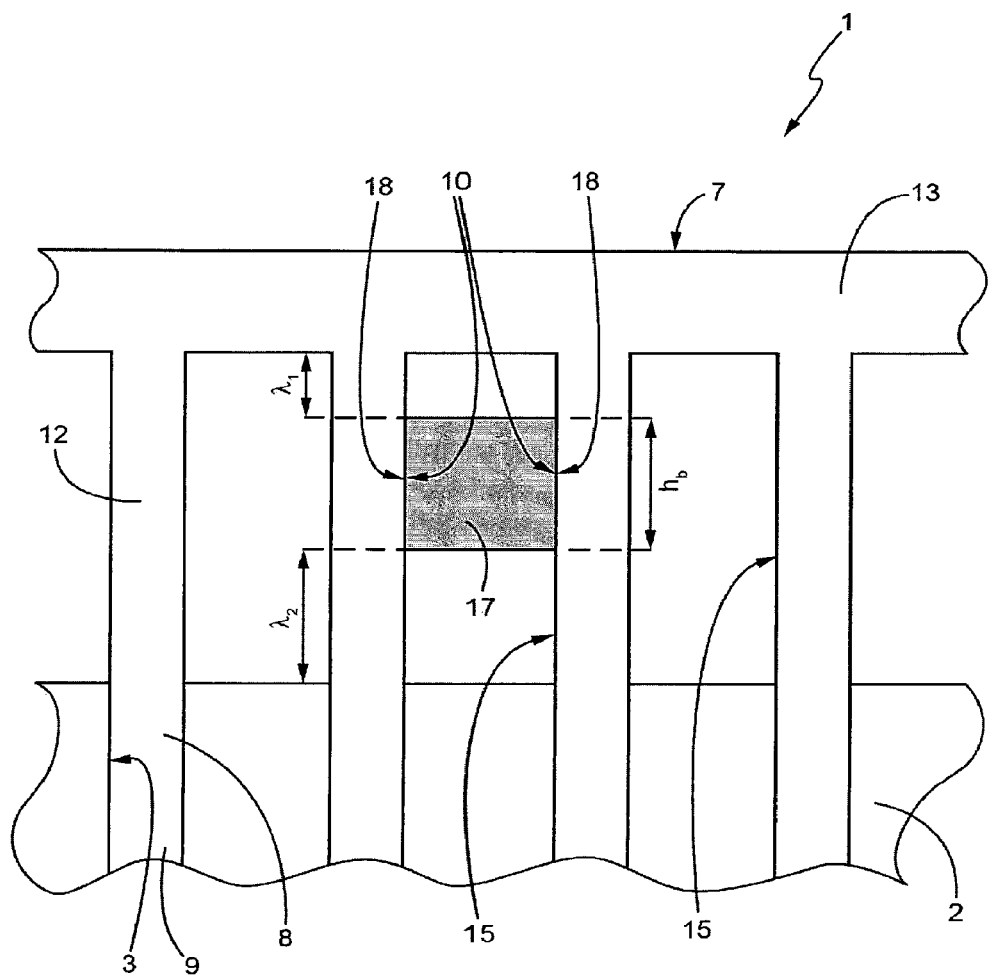
FIG. 2 is an enlarged and schematic view of a stiffening block between two consecutive bars of the rotor cage of FIG. 1.

In particular, with reference to FIG. 2, to achieve the desired increase in torsional stiffness and optimise the tension levels in the portions 12 that are connected to the stiffening blocks 17, the most appropriate value for the length $h_b$ of the stiffening blocks 17 in the axial direction and the most appropriate values for the axial distance's $\lambda_1$ and $\lambda_2$ of the stiffening blocks 17 from the shorting ring 13 and, respectively, from the stack 2 are determined.

Preferably the thickness of the stiffening blocks 17 in the radial direction is substantially equal to or slightly less than that of the portions 12, so that the stiffening blocks 17 do not protrude radially with respect to the portions 12.

Torsional and flexural stiffness are the greatest when the stiffening block 17 is arranged centrally in the respective space 15, i.e. when $\lambda_1 = \lambda_2$. For this reason, this is the best position in order to maximize the overall stiffness of the rotor 1.

Figure 3:
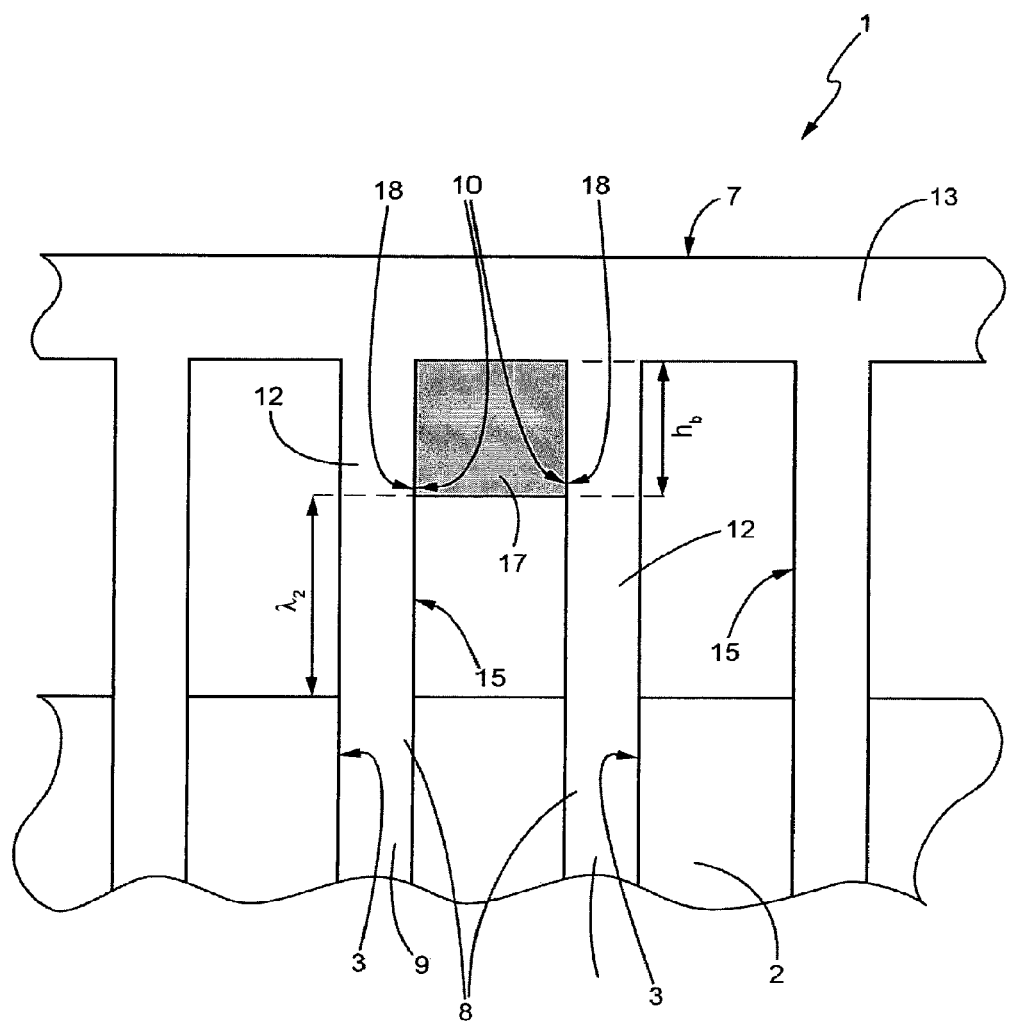
FIGS. 3 and 4 are alternative embodiments illustrating different possible arrangements of the stiffening block of FIG. 2.
Figure 4:
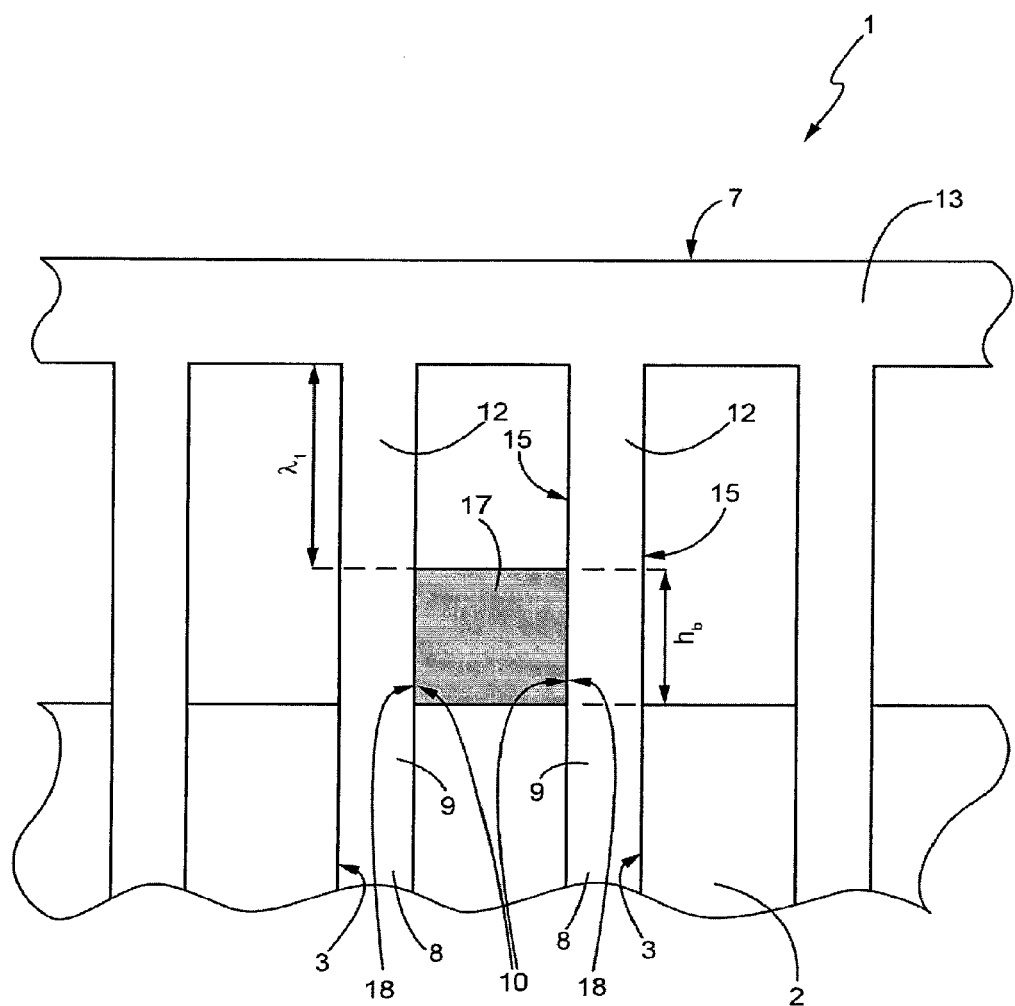

Alternatively, the stiffening block 17 may be arranged at the ends of the portions 12, i.e. with $\lambda_1 = 0$ (FIG. 3) or $\lambda_2 = 0$ (FIG. 4): these arrangements may be convenient depending on the method used to assemble and/or manufacture the rotor 1. To achieve the same stiffness as that of the configuration of FIG. 2, it will presumably be necessary to use stiffening blocks 17 with a greater length $h_b$.

For example, choosing $\lambda_1 = 0$ (FIG. 3), i.e. arranging the stiffening block so that it is axially in contact with the shorting ring 13, is advantageous in that it allows the stiffening block 17 to be attached directly to the shorting ring 13, and even allows the stiffening blocks 17 and the shorting ring 13 to be made as a one-piece copper construction.

Figure 5:
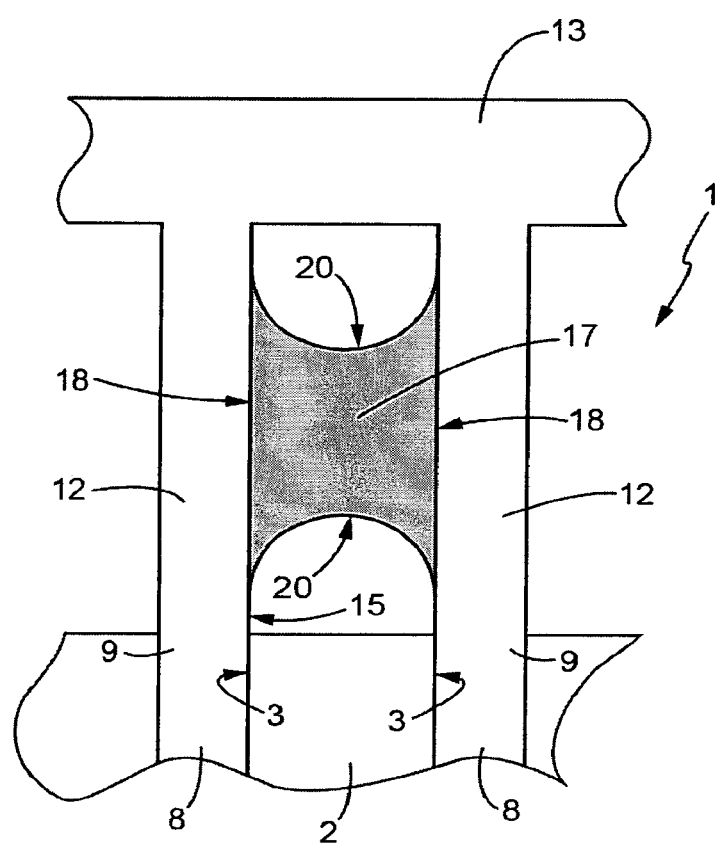
FIG. 5 shows an alternative embodiment of the stiffening block.

FIG. 5 shows a stiffening block 17 having a different shape: the axial ends thereof are hollowed out so as to have two concave and substantially semi-cylindrical faces 20, with a curvature axis directed radially respect to the axis 4. The curvature radius of the faces 20 enables to reduce the stress concentration which is transmitted by the stiffening block 17 to the bar portions 12 along the upper and lower edges of the interface defined by the surfaces 18 as a consequence of the torsion of the cage 7. It also enables the surfaces 18 to be made axially longer and thus bigger, to reduce the intensity of the stress due to the torsion of the cage 7 and transmitted between the portions 12 and the stiffening block 17 at the interface defined by the two surfaces 18.

Alternative embodiments to those illustrated could be envisaged, all with the purpose of reducing the stress in the stiffening blocks 17.

As regards the material used to make the stiffening blocks 17, this must be stiff enough to limit the deformations of the portions 12 and must be easily connectable to the bars 8. For example, the material of the stiffening blocks 17 is copper, i.e. the same material as the cage 7. Alternatively, it is an electric insulator material, in order to avoid electromagnetic interference, which could occur due to a possible asymmetric arrangement of the conducting material of the cage 7.

As regards the method used to join the stiffening blocks 17 to the portions 12 of the bars 8, this must guarantee the constant contact of the surfaces 18 against the side surfaces 10 of the bars 8. Basically, the process used to couple and fasten the stiffening blocks 17 to the adjacent bars 8 depends on the type of material used to manufacture said stiffening blocks 17. If these are made of metal, for example of the same material as the cage 7, the stiffening blocks 17 are welded to the portions 12 of the adjacent bars 8, advantageously during the same step in which the apexes of the bars 8 are welded to the shorting ring 13, so that all the components of the cage 7 are assembled at the same time. In particular an induction welding process can be used.

If the stiffening blocks 17 are made of an electric insulator material, a gluing process with epoxy resins is preferable. In particular, said process consists of heating the solid epoxy resin until it melts and forms a glue, then arranging the stiffening blocks 17 in the positions defined in the design stage; applying the glue between the stiffening blocks 17 and portions 12, and lastly allowing the glue to harden by leaving the rotor 1 at room temperature for a predefined time.

Alternatively, the stiffening blocks 17 are connected to the portions 12 by means of screws, or by means of an interference fitting.

From the above description the advantages deriving from the insertion of the stiffening blocks 17 are apparent. In particular, by increasing the values of the torsional eigenfrequencies of the rotor 1 it is possible to avoid resonance and, thus, to limit the extent of the deformations in torsion, with subsequent reductions in fatigue, without significantly altering the electromagnetic behaviour of the rotor 1 and, thus the efficiency of the engine. As mentioned above, the torsional stiffening must be such as to cause at least the first torsional frequency to rise to a value that is sufficiently higher than the torque moment harmonic frequencies caused by the inverter that supplies the stator windings.

The solution provided here is extremely simple compared to other solutions proposed in the prior art, and is very effective in that the insertion of a relatively small number of stiffening blocks results in a large increase in the torsional stiffness of the rotor.

Lastly, from the above description, it is clear that modifications and variations may be made to the rotor 1 described herein without departing from the scope of the present invention as set forth in the appended claims.

In particular, as mentioned above, the number, the position and the dimensions of the stiffening blocks could differ from those shown by way of example.

The invention claimed is:

1. A squirrel-cage rotor for asynchronous motors, comprising:
    a lamination stack made of magnetic material defining a plurality of slots;
    a cage comprising:
    a) a plurality of bars having intermediate portions that engage said slots, and opposing end portions that protrude with respect to said lamination stack;
    b) two shorting rings fixed to said end portions;
    a plurality of spaces defined, axially, by said lamination stack and said shorting rings, and tangentially by said end portions;
wherein some of said spaces are engaged by stiffening blocks, each stiffening block being in contact with the end portions of both the adjacent bars; the number, the positions and the dimensions of said stiffening blocks being defined so as to increase at least the first torsional eigenfrequency of the rotor to a value higher than the first harmonic frequency of the torque oscillations.

2. The rotor according to claim 1, wherein said stiffening blocks are fixed directly to the end portions of the adjacent bars.

3. The rotor according to claim 2, wherein said stiffening blocks are welded to said end portions.

4. The rotor according to claim 2, wherein said stiffening blocks are glued to said end portions.

5. The rotor according to claim 1, wherein, in each axial end of the rotor, said stiffening blocks are arranged at an equal distance from one another about the axis of the rotor.

6. The rotor according to claim 1, wherein, in each axial end of the rotor, said stiffening blocks have the same shape, the same dimensions, and the same positions in the respective spaces.

7. The rotor according to claim 1, wherein said stiffening blocks are arranged axially in a central position between said lamination stack and the shorting ring.

8. The rotor according to claim 1, wherein said stiffening blocks are arranged in contact with the shorting ring.

9. The rotor according to claim 8, wherein said stiffening blocks are made in one-piece with the shorting ring.

10. The rotor according to claim 1, wherein the number of said stiffening blocks proportional to the pole pairs of the motor.

11. The rotor according to claim 1, wherein said stiffening blocks are made of an electric insulator material.

12. The rotor according to claim 1, wherein said stiffening blocks are made of copper.

13. The rotor according to claim 1, wherein said stiffening blocks are parallelepiped in shape.

14. The rotor according to claim 1, wherein said stiffening blocks are delimited axially by concave surfaces.

* * * * *